(12) United States Patent
Lipsit

(10) Patent No.: US 7,330,724 B2
(45) Date of Patent: Feb. 12, 2008

(54) TESTING METHODS AND APPARATUS FOR WIRELESS COMMUNICATIONS

(75) Inventor: James Mason Lipsit, Lake Worth, FL (US)

(73) Assignee: AT&T Mobility II LLC, Atlanta, GA (US)

( * ) Notice: Subject to any disclaimer, the term of this patent is extended or adjusted under 35 U.S.C. 154(b) by 144 days.

(21) Appl. No.: 11/330,486

(22) Filed: Jan. 12, 2006

(65) Prior Publication Data

US 2006/0105763 A1  May 18, 2006

Related U.S. Application Data

(62) Division of application No. 09/724,577, filed on Nov. 28, 2000, now Pat. No. 7,016,672.

(51) Int. Cl.
*H04B 17/00* (2006.01)

(52) U.S. Cl. .................................. 455/423; 455/67.11

(58) Field of Classification Search ................ 455/423, 455/424, 425, 67.11, 67.13, 67.14, 67.7; 370/241, 242, 249
See application file for complete search history.

(56) References Cited

U.S. PATENT DOCUMENTS

| | | | |
|---|---|---|---|
| 4,977,399 A | 12/1990 | Price et al. | |
| 5,023,900 A | 6/1991 | Tayloe et al. | |
| 5,031,204 A | 7/1991 | McKernan | |
| 5,095,500 A | 3/1992 | Tayloe et al. | |
| 5,425,076 A | 6/1995 | Knippelmier | |
| 5,481,588 A | 1/1996 | Ricki et al. | |
| 5,703,929 A | 12/1997 | Schillaci et al. | |
| 5,903,626 A | 5/1999 | Iglehart et al. | |
| 5,956,636 A | 9/1999 | Lipsit | |
| 5,974,311 A | 10/1999 | Lipsit | |
| 6,236,365 B1 * | 5/2001 | LeBlanc et al. | ............. 342/457 |
| 6,788,934 B2 * | 9/2004 | Keenan et al. | ............... 455/424 |

OTHER PUBLICATIONS

Lucent Technologies DEFINITY® G3si Telephone System Users Guide, Sep. 1998, 53 pgs.

* cited by examiner

*Primary Examiner*—Lee Nguyen
(74) *Attorney, Agent, or Firm*—Coulter Henry; Parks Knowlton LLC; Paul Knowlton, Esq.

(57) ABSTRACT

Several testing methods and apparatus for wireless communications, such as a cellular telephone communications, are described. One method for use in troubleshooting a problematic call in a wireless communication system by a computer test station includes the steps of receiving a telephone call from a wireless telephone unit while the wireless telephone unit is simultaneously connected in a call; receiving, during the telephone call, first information which identifies the wireless telephone unit and second information which identifies a wireless switch utilized in the call; sending, during the telephone call, a trace command having the caller ID information to an address associated with the wireless switch; and receiving, in response to sending the trace command, call trace information including information that identifies a plurality of devices of the wireless switch utilized in the call. In response, the computer test station delivers a message that includes this device information to, for example, the wireless telephone unit or a system maintenance computer for appropriate handling.

5 Claims, 10 Drawing Sheets

FIG. 10

EXAMPLE REPORT FOR AUTODIALER

| | MISSED CALL DETAIL FROM AUTO TEST | | | |
|---|---|---|---|---|
| CALL TESTING: | 14:40:00 | | | |
| REPORT CREATED: | 2:29:03 PM | | | |
| | | | | |
| SOFTWARE VERSION: | R2D | DA7B | 1.01 | 1.05 |
| MOBILE NUMBER: | 5617581425 | 5617581420 | 5617581421 | 5617581423 |
| ELECTRONIC SERIAL NUMBER: | 23108010239 | 22315155803 | 2350344127S | 2350443332Z |
| MANUFACTURER: | MFTR #1 | MFTR #2 | MFTR #3 | MFTR #3 |
| MODEL: | 688 | 70 | 6160 | 6160 |
| ON CALL TIME: | 12 | 12 | 12 | 12 |
| OFF CALL TIME: | 2 | 2 | 2 | 2 |
| TOTAL CALLS ATTEMPTED: | 100 | 100 | 100 | 100 |
| TOTAL CALLS FAILED: | 7 | 8 | 9 | 21 |
| 1 | 14:40:01;SUCCESS | 14:40:01;SUCCESS | 14:40:01;SUCCESS | 14:40:01;SUCCESS |
| 2 | 14:40:29;SUCCESS | 14:40:29;SUCCESS | 14:40:28;SUCCESS | 14:40:28;SUCCESS |
| 3 | 14:41:05;SUCCESS | 14:41:05;SUCCESS | 14:41:05;SUCCESS | 14:41:05;SUCCESS |
| 4 | 14:41:31;SUCCESS | 14:41:33;SUCCESS | 14:41:32;SUCCESS | 14:41:30;FAILED |
| 5 | 14:41:55;SUCCESS | 14:42:00;SUCCESS | 14:41:58;SUCCESS | 14:41:59;SUCCESS |
| 6 | 14:42:22;SUCCESS | 14:42:26;SUCCESS | 14:42:25;SUCCESS | 14:42:25;SUCCESS |
| 7 | 14:42:49;SUCCESS | 14:42:53;SUCCESS | 14:42:51;SUCCESS | 14:42:53;SUCCESS |
| 8 | 14:43:13;SUCCESS | 14:43:20;SUCCESS | 14:43:15;SUCCESS | 14:43:16;SUCCESS |
| 9 | 14:43:39;SUCCESS | 14:43:47;SUCCESS | 14:43:41;SUCCESS | 14:43:43;SUCCESS |
| 10 | 14:44:06;SUCCESS | 14:44:14;SUCCESS | 14:44:07;SUCCESS | 14:44:08;SUCCESS |
| 11 | 14:44:33;SUCCESS | 14:44:41;SUCCESS | 14:44:34;SUCCESS | 14:44:34;SUCCESS |
| 12 | 14:45:00;SUCCESS | 14:45:08;SUCCESS | 14:45:02;SUCCESS | 14:45:01;SUCCESS |

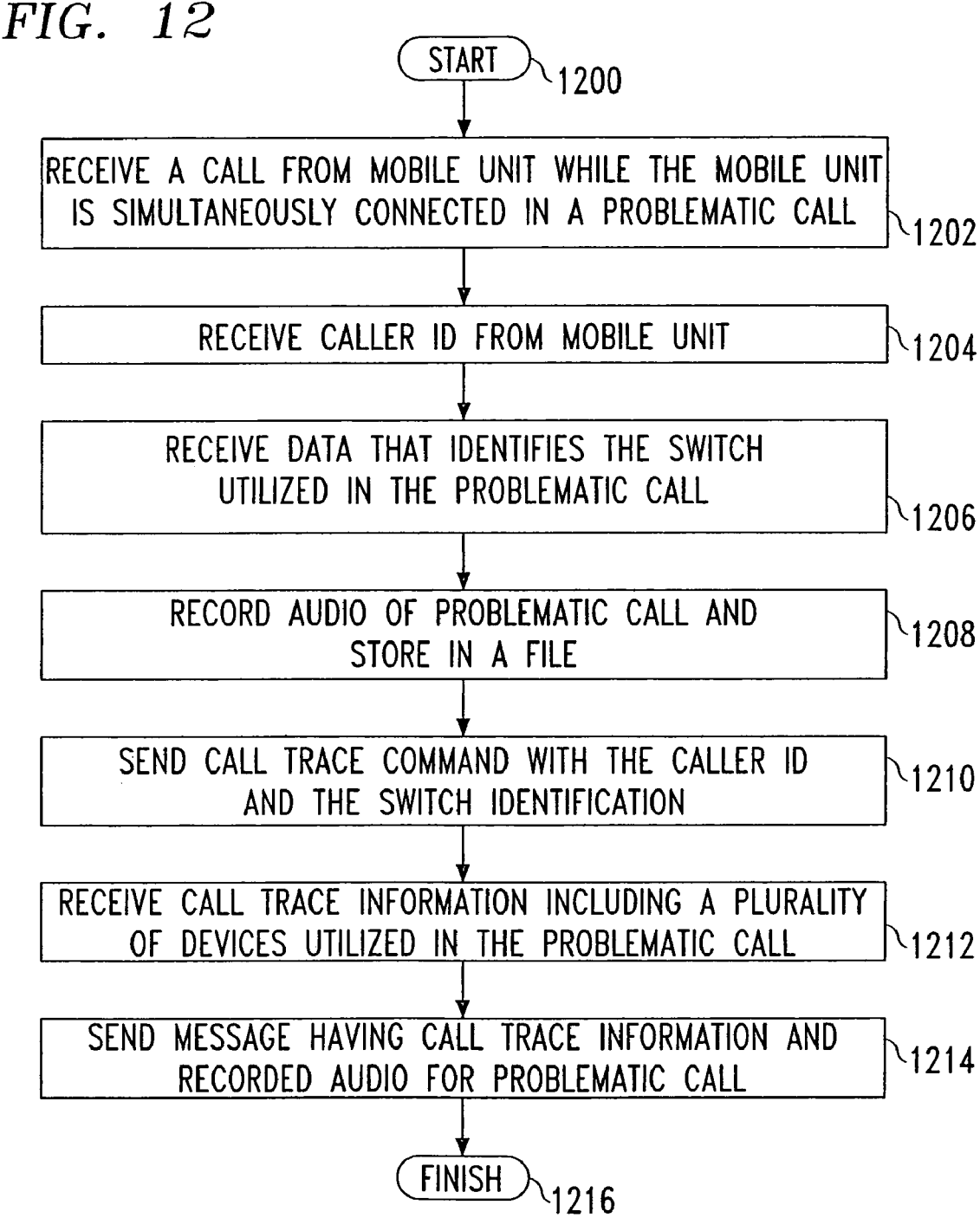

TESTING METHODS AND APPARATUS FOR WIRELESS COMMUNICATIONS

BACKGROUND OF THE INVENTION

1. Field of the Invention

The present invention relates generally to the field of testing methods and apparatus for wireless communications, such as cellular telephone communications.

2. Description of the Related Art

Conventional testing methods for use in wireless communications, such as cellular telephone communications, employ a laptop computer connected to a wireless communication device, such as a cellular telephone. During "drive testing," software in the laptop computer records data, such as signal strength data and channel identification data. The software may also provide some automated control of the cellular telephone, such as an automated repetitive dialing of telephone numbers for making telephone calls. The laptop computer is connected to the cellular telephone via a serial interface connection that is unique to the make and/or model of the cellular telephone. Software in the laptop computer that facilitates data communication with the cellular telephone is also unique to the cellular telephone's make and/or model. Also, the laptop computer is dedicated to the cellular telephone during the test.

Other conventional testing methods make use of an audio coupler, such as the "Auto Coupler" device provided by Gentner Communications Corporation of Salt Lake City, Utah, U.S.A. An audio coupler is connectable to a telephone land line and an audio source, such as an FM radio source. Cellular telephones can access the audio coupler and its accompanying audio signals by dialing a telephone number associated with the land line. The connection between the cellular telephone and audio coupler is established with the use of switching software. Thus, a user has the ability to listen to the audio quality of the audio signals from the cellular telephone.

The conventional testing methods described above are limited. Only a particular type of cellular telephone can operate in connection with the laptop computer and its software, and multiple cellular telephones at different geographic locations cannot be simultaneously tested by it. The testing methods using the audio coupler are more flexible since a number of different types of cellular telephones may access it; however, this provides too much accessibility. In addition, the test functionality provided by the audio coupler is limited.

Accordingly, there is an existing need to provide more flexible, efficient, user-friendly, and secure testing methods and apparatus for wireless telephone communications.

SUMMARY OF THE INVENTION

Several testing methods and apparatus described herein relate to the use of a computer test station that provides the ability to simultaneously test the operations of a plurality of wireless telephone units within a wireless communication system. The computer test station resides at a location that is remote from the wireless telephone units. Users of the wireless telephone units set up operational tests by placing telephone calls to the computer test station and selecting from a plurality of available test functions. When a call is made to the computer test station, security is provided by screening caller identification (ID) numbers and/or personal identification numbers (PINs) from the wireless telephone units. Additional security is provided by assigning an abbreviated dialing number (e.g., "#TEST") to the computer test station for sole access thereto, which inhibits access to the computer test station by those wireless telephone units assigned to a different service provider. The selected test functions are executed by the computer test station sometime after the setup calls are terminated. The computer test station stores test data regarding the execution of the tests for each wireless telephone unit, preferably in association with its corresponding caller ID information for optimal organization.

Thus, one inventive method for use in testing the operation of a wireless telephone unit within a wireless communication system by a computer test station located remotely from the wireless telephone unit includes the steps of receiving a telephone call from the wireless telephone unit; receiving, during the telephone call, signals for selecting one of a plurality of test functions; receiving, during the telephone call, one or more parameters for execution of the selected test function; and executing, after termination of the telephone call, a predetermined test process corresponding to the selected test function using the one or more parameters.

Another method for use in testing the operation of a wireless telephone unit within a wireless communication system by a computer test station located remotely from the wireless telephone unit includes the steps of receiving caller identification (ID) information associated with a wireless telephone unit during a wireless communication therefrom; receiving dual-tone multiple frequency (DTMF) signals from the wireless telephone unit during the wireless communication; selecting one of a plurality of test functions based on the DTMF signals; after termination of the wireless communication, executing the selected test function and receiving test data associated with the wireless telephone unit; and storing the test data in association with the caller ID information. A related method for use in simultaneously testing a plurality of wireless telephone units operative for wireless communications includes the steps of receiving first caller identification (ID) information associated with a first wireless telephone unit; performing a first test function during a first time period in connection with the first wireless telephone unit and generating first test data therefrom; storing the first test data in association with the first caller ID information; receiving second caller identification (ID) information associated with a second wireless telephone unit; performing a second test function during a second time period in connection with the second wireless telephone unit and generating second test data therefrom; and storing the second test data in association with the second caller ID information.

A method for use in providing a telephone unit with remote access to functions of a computer processor includes the steps of receiving a telephone call from a telephone unit; receiving a caller identification (ID) number of the telephone unit upon receiving the telephone call; comparing the caller ID number with a plurality of prestored caller ID numbers; and granting or denying access to functions of the computer processor based at least in part on the comparing. This method may include the further steps of receiving a personal identification number (PIN) selected at the telephone unit; comparing the PIN with a prestored PIN associated with a prestored caller ID number that matches the received caller ID number; wherein granting or denying access is based at least in part on the comparing of the caller ID number and the comparing of the PIN.

A particular test function for testing the operation of a wireless telephone unit within a wireless communication system by a computer test station located remotely from the wireless telephone unit includes the steps of initiating a telephone connection request to the wireless telephone unit; detecting whether a connection was made with the wireless telephone unit in response to initiating the telephone connection request; repeating the initiating and detecting a total number of N times; and storing data indicative of a number of connections made with the wireless telephone unit during the repeated initiating and detecting. Another particular test function for use in testing the operation of a wireless telephone unit within a wireless communication system by a computer test station located remotely from the wireless telephone unit includes the steps of sending audio signals during a telephone connection with the wireless telephone unit; detecting a disconnection with the wireless telephone unit; initiating a telephone connection request to the wireless telephone unit if a disconnection is detected; repeating the sending, and any detecting and initiating, over a time period T; and storing data indicative of a number of disconnections with the wireless telephone unit over the time period T.

A test station for testing the operation of a wireless telephone unit within a wireless communication system may include a computer; wireless communication test software residing on memory that is accessible to the computer; a computer telephony card coupled to the computer, where the computer telephony card has a plurality of telephone line interfaces, and each telephone line interface is associated with a respective one of a plurality of telephone numbers of a hunt group. Another test station for testing a wireless telephone unit within a wireless communication system may include a computer; wireless communication test software residing on memory that is accessible to the computer; a computer telephony card coupled to the computer, where the computer telephony card has at least one telephone line interface that is accessible by an abbreviated dialing telephone number. A related telecommunication system method for providing a plurality of wireless telephone units with remote access to a computer test station includes the steps of receiving an abbreviated dialing telephone number to establish a telephone call connection; selecting one of a plurality of telephone numbers of a hunt group that is associated with the abbreviated dialing telephone number, each one of the plurality of telephone numbers being associated with a computer test station; and facilitating the telephone call connection between a wireless telephone unit and the computer test station with use of the selected telephone number.

Finally, a preferred method for use in troubleshooting a call in a wireless communication system by a computer test station includes the steps of receiving a telephone call from a wireless telephone unit while the wireless telephone unit is simultaneously connected in a call; receiving, during the telephone call, first information which identifies the wireless telephone unit and second information which identifies a wireless switch utilized in the call; sending, during the telephone call, a call trace request with use of the first and the second information; and receiving, in response to sending the call trace request, call trace information including information that identifies a plurality of devices of the wireless switch utilized in the call.

BRIEF DESCRIPTION OF THE DRAWINGS

FIG. 10 is an illustrative representation of a visual presentation of test data from the execution of the test function as described in relation to FIG. 9;

FIG. 12 is a flowchart describing a method of executing a troubleshooting function which provides call tracing for problematic telephone calls.

DETAILED DESCRIPTION OF THE PREFERRED EMBODIMENTS

Figure 1:
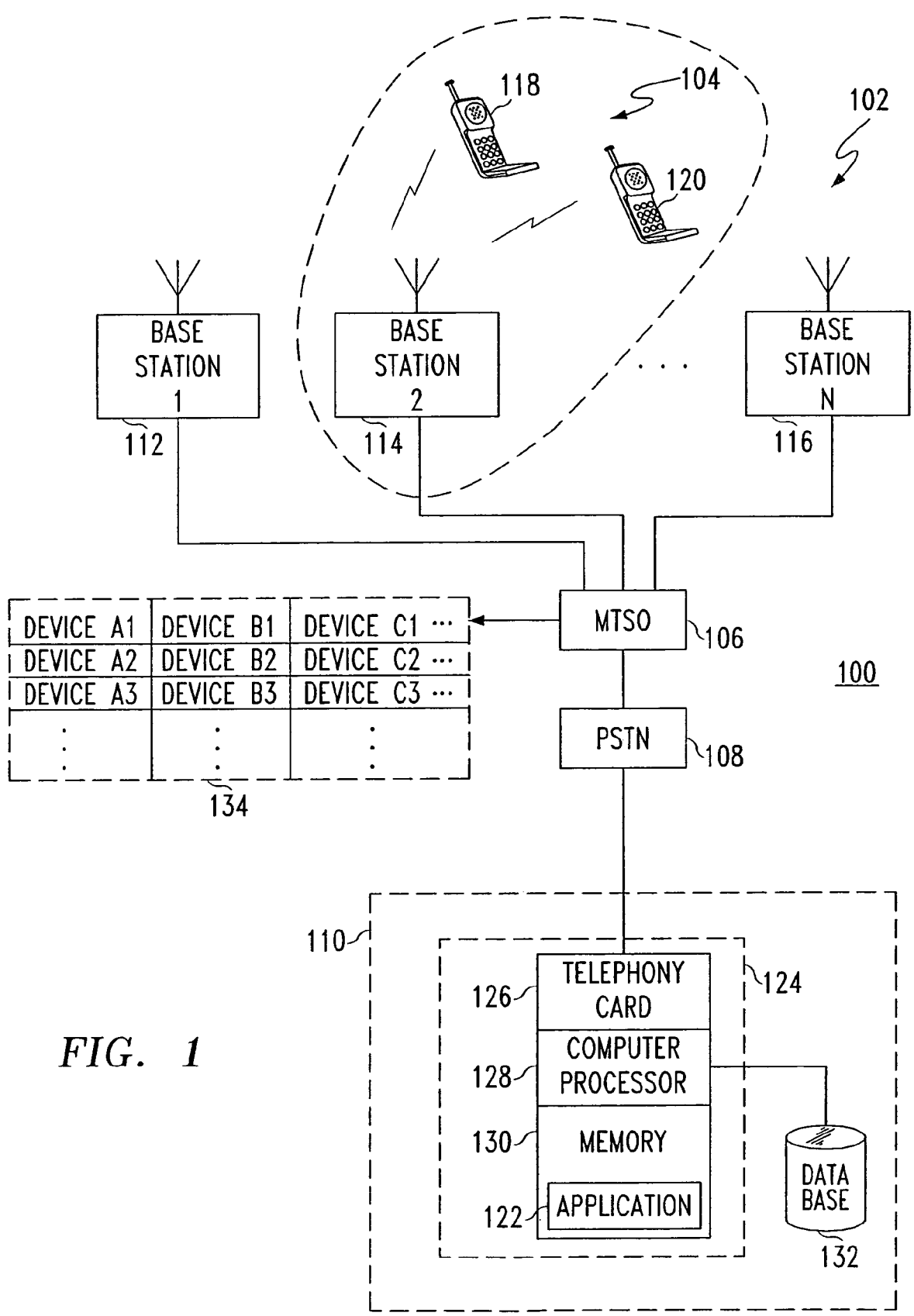
FIG. 1 is an illustrative representation of a telecommunication system, which includes a wireless communication system, utilizing a computer test station.

FIG. 1 is a block diagram of a telecommunication system 100. Telecommunication system 100 includes a public switched telephone network (PSTN) 108 and a wireless communication system 102. In this embodiment, wireless communication system 102 is a cellular telephone system having a plurality of mobile telephone switching offices (MTSO), such as an MTSO 106, and a plurality of base stations coupled to the MTSOs, such as base stations 112, 114, and 116 coupled to MTSO 106. A plurality of wireless telephone units 104 are served by the plurality of base stations 102 in wireless communication system 102, such as wireless telephone units 118 and 120 being served by base station 114. In making wireless connections for calls, the MTSOs operate and select from a plurality of devices 134, which is described in more detail below.

Figure 3:
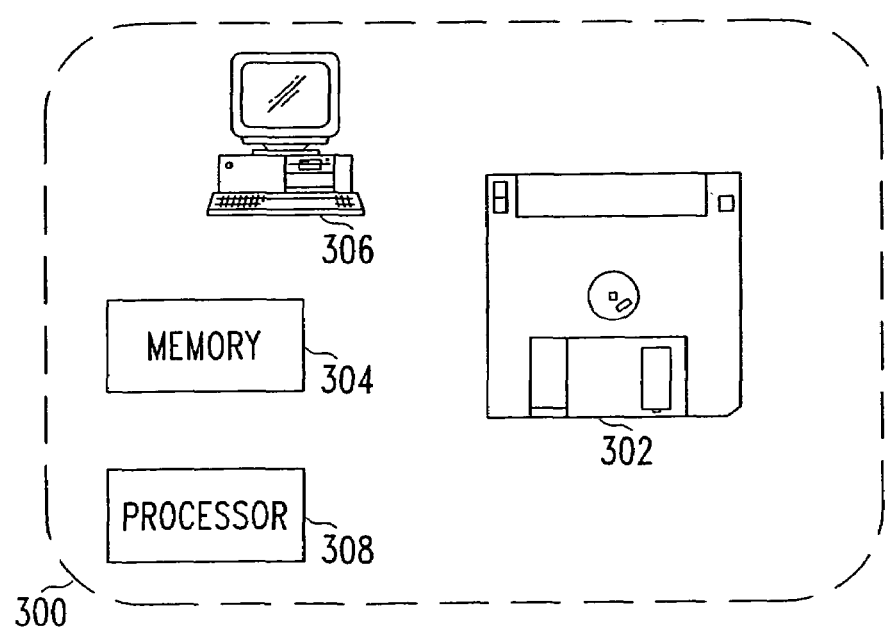
FIG. 3 is an illustration of various software components which may be utilized in connection with the methods executed at the computer test station.

A computer test station 110 is coupled to telecommunication system 100 and is located remotely from the plurality of wireless telephone units 104. Computer test station 110 includes a computer 124, a computer telephony card 126, a central processing unit (CPU) or computer processor 128, a memory 130, a software application 122, and a database 132. Application 122 includes wireless telephone communication test software which is executed by computer processor 128. Application 122 is executable to perform test functions, test setup functions, and to control computer telephony card 126, as described in more detail below. Referring ahead to FIG. 3, the methods described herein may be embodied and implemented more generally in connection with software using software components 300 shown in FIG. 3. The software may be embedded in or stored on a disk 302 or memory 304, executable on a computer 306 or a processor 308. Thus, the inventive features may exist in a signal-bearing medium which embodies a program of machine-readable instructions executable by a processing apparatus which perform the methods.

Referring back to FIG. 1, computer telephony card 126 has a telephone line interface for coupling to a plurality of land lines (e.g., four land line interfaces associated with four different telephone numbers). Computer telephony card 126 is used for telephonic functions, encode and decode, and line selection. Computer telephony card 126 preferably embodies a voice response unit (VRU) for accessing and selecting functions of computer test station 110. A suitable computer telephony card 126 may be provided by Dialogic™ of Parsippany, N.J., U.S.A.

Figure 2:
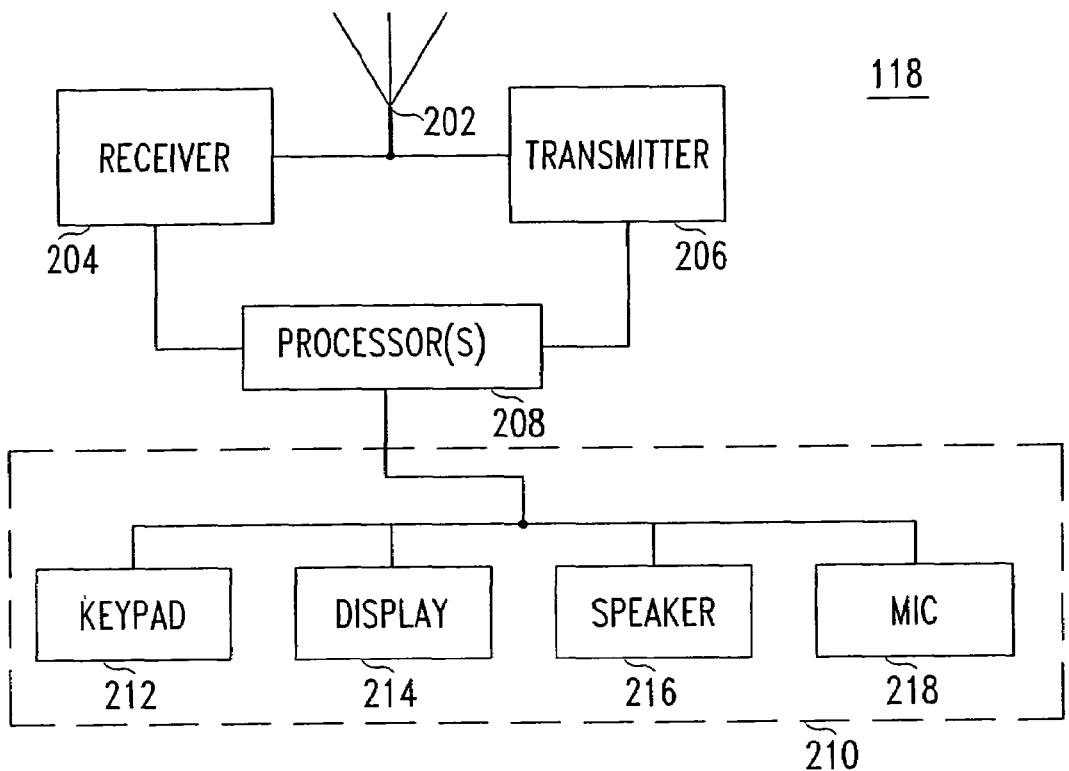
FIG. 2 is a schematic block diagram of a wireless telephone unit in the wireless communication system of FIG. 1.

FIG. 2 is a schematic block diagram of wireless telephone unit 118 of wireless communication system 102 of FIG. 1. Wireless telephone unit 118 of FIG. 2 may be representative of each wireless telephone unit utilized in wireless communication system 102 of FIG. 1. Wireless telephone unit 118 has an antenna 202, a wireless receiver 204 and a wireless transmitter 206 coupled to antenna 202, one or more processors 208 which control reception and transmission, and a user interface 210 also controlled by one or more processors 208. User interface 210 of wireless telephone unit 118 may include one or more of a keypad 212, a visual display 214, a speaker 216, and a microphone 218. Keypad 212 may include a dual-tone multiple frequency (DTMF) keypad. Visual display 214 is utilized for confirmation of user-selected information and for the display of messages and visual presentations. Speaker 216 and microphone 218 are utilized for listening and speaking, respectively, in telephonic communications. Wireless telephone unit 118 may be a cellular telephone which has a unique Mobile Identification Number (MIN) or caller identification (ID) number associated therewith.

Figure 4:
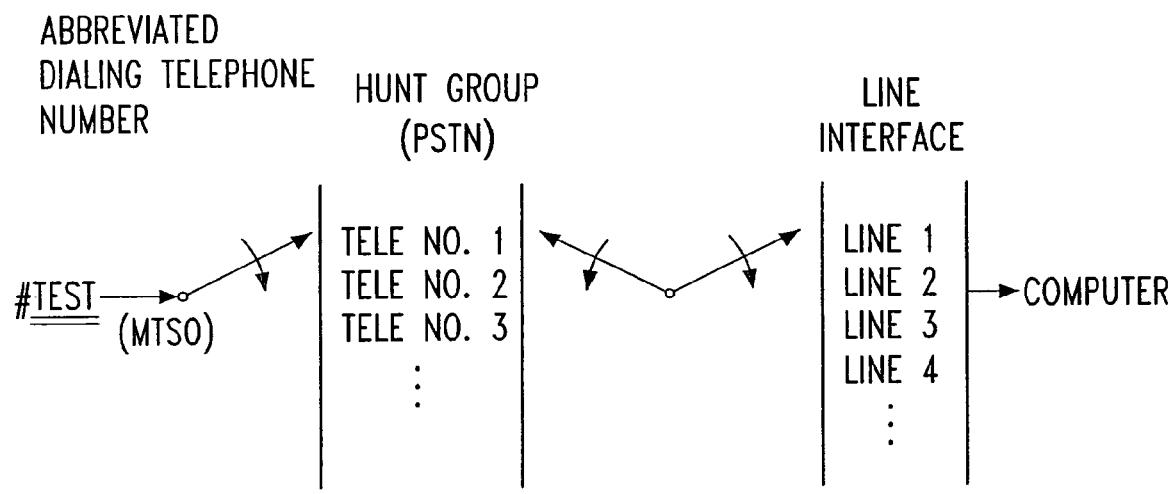
FIG. 4 is an illustrative representation of the selections involved in connecting a telephone call between the computer test station and a wireless telephone unit.

FIG. 4 is an illustrative representation related to the use of an abbreviated dialing telephone number, such as "#TEST" (or #8378), for use by multiple wireless telephone units in accessing computer test station 110 of FIG. 1. "Abbreviated Dialing" and the use of abbreviated dialing telephone numbers are well-known, but not in connection with computer test station 110 for testing wireless communications as described herein. Referring to FIGS. 1 and 4 in combination, wireless telephone unit 118 initially dials #TEST in an attempt to access computer test station 110. The telephone connection request with #TEST is received at MTSO 106. MTSO 106 substitutes #TEST with a telephone number (via a lookup table) and transfers the request to PSTN 108. It is noted that the abbreviated telephone number, #TEST, is not recognizable by MTSOs of other service providers. In addition, the telephone number submitted to PSTN 108 is generally not usable in a direct fashion by any telephone unit for connection. PSTN 108 receives this telephone number and selects an available number (i.e., one that is not in use) from a plurality of telephone numbers of a "hunt group" associated therewith. Each one of the plurality of telephone numbers of the hunt group is associated with a corresponding land line coupled to computer telephony card 126.

Each time a wireless telephone unit dials in, a new instance of the test application is utilized. When multiple wireless telephone units are being served by computer test station 110 simultaneously, multiple instances of the test software are running. Using the same abbreviated dialing number, then, multiple wireless telephone units may access computer test station 110 at the same or different times, and select from a number of different functions. Advantageously, computer test station 110 is associated with an easy-to-remember access number and multiple wireless units can use computer test station 110 simultaneously. Another result, somewhat unexpected, is that only wireless telephone units having service associated with MTSO 106 are allowed access to computer test station 110; others cannot gain access.

Figure 6:
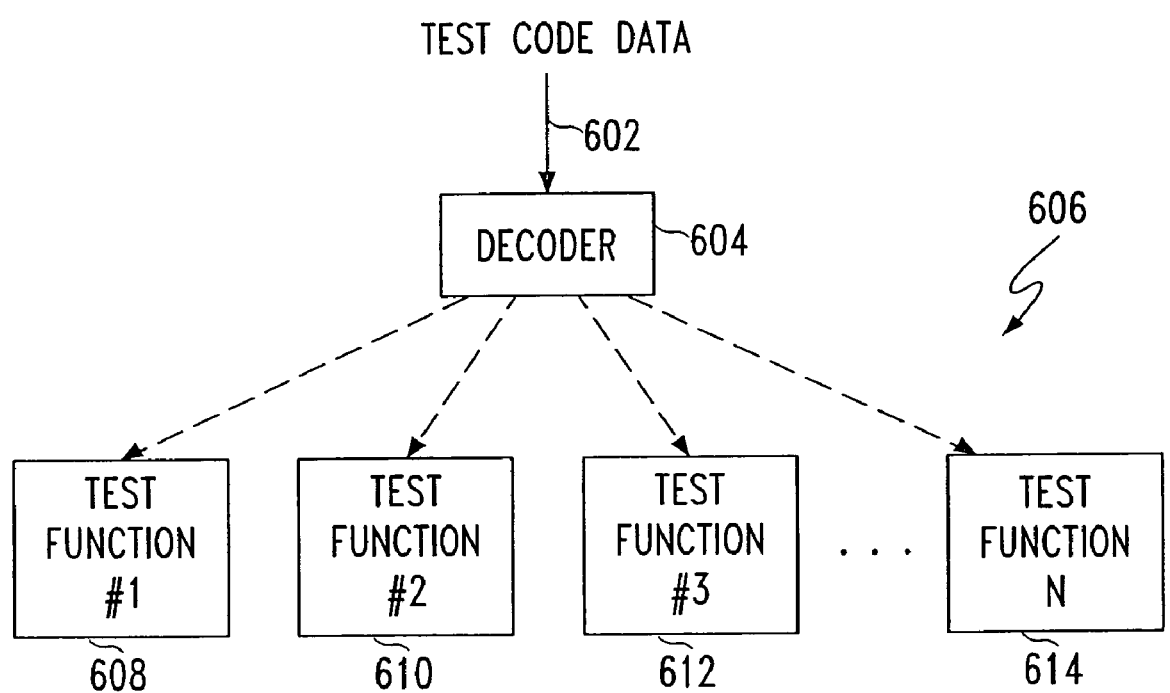
FIG. 6 is an illustrative representation of a plurality of test functions available at the computer test station.

Referring ahead to FIG. 6, computer test station 110 of FIG. 1 is equipped to execute a plurality of tests or test functions 606, such as a test function 608, a test function 610, a test function 612, and a test function 614. Test function 608 may be, for example, an answered call test as described later in relation to FIGS. 8-10, and test function 610 may be, for example, a dropped call test as described later in relation to FIG. 11. Computer test station 110 of FIG. 1 may receive test code data 602 in the form of DTMF signals which are selected at wireless telephone unit 118 (via its user interface). Here, a decoder 604 is utilized to detect one of a plurality of different test codes which uniquely corresponds to one of the plurality of test functions 606. Preferably, decoder 604 is part of the VRU utilized at computer test station 110. Thus, computer test station 110 provides voice prompting for the wireless telephone units for system access and test selection. The selected test function is executed by computer test station 110 sometime after its selection by wireless telephone unit 118.

Figure 5:
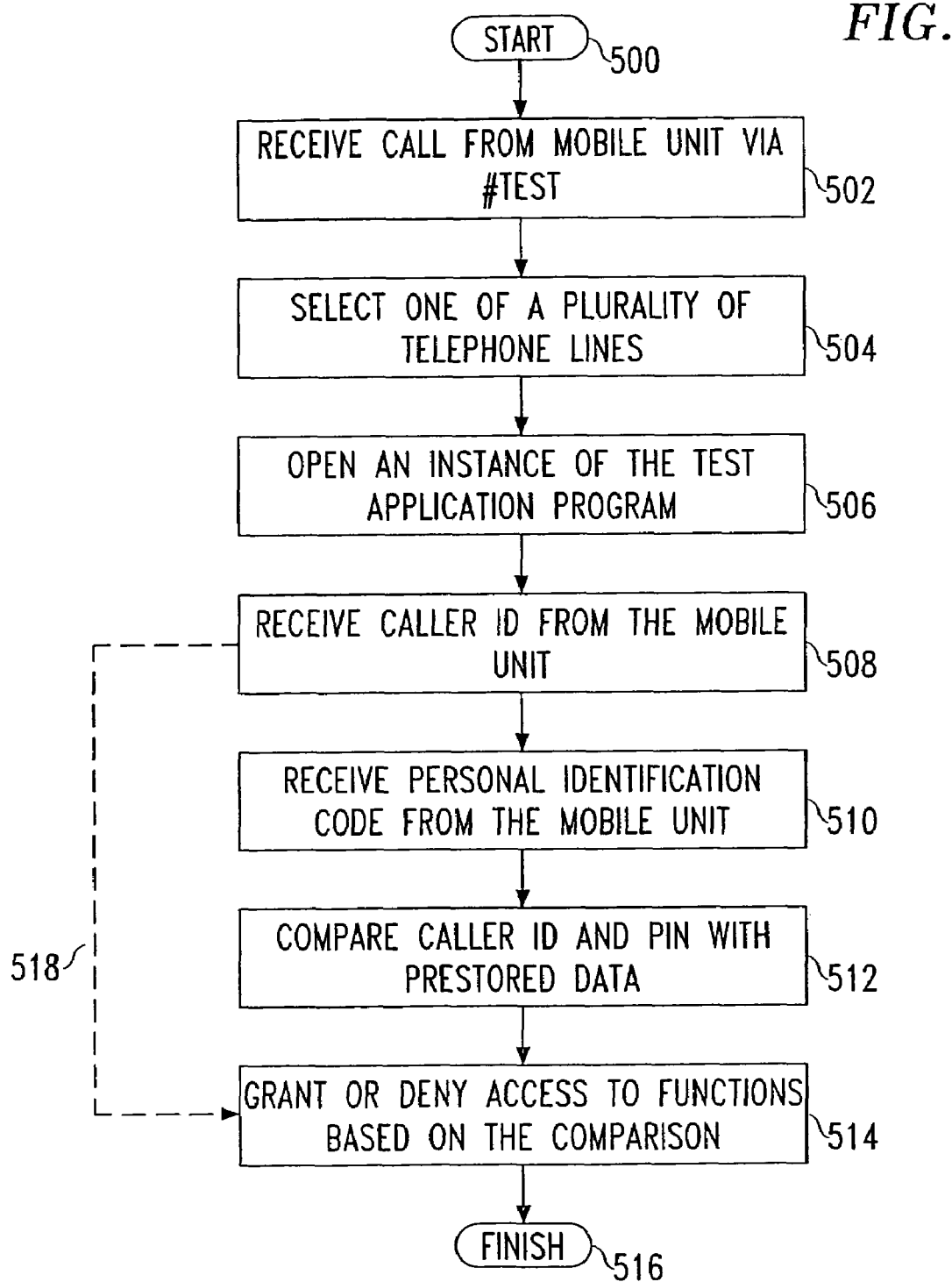
FIG. 5 is a flowchart describing a method for use in accessing the computer test station.

FIG. 5 is a flowchart describing a method for use in accessing computer test station 110. Beginning at a start block 500, computer test station 110 receives a telephone call from wireless telephone unit 118 when a user of wireless telephone unit 118 dials "#TEST" (step 502). Being able to handle simultaneous telephone calls and tests, computer test station 110 selects one of a plurality of telephone lines for the telephone call (step 504) and executes an (additional) instance of the test application program (step 506). Upon receiving the telephone call, computer test station 110 receives caller ID information from wireless telephone unit 118 (step 508). Computer test station 110 prompts wireless telephone unit 118 to enter a personal identification number (PIN). The user of wireless telephone unit 118 enters the PIN (for example, via DTMF keypad) and computer test station 110 receives this data (step 510).

In database 132, each number of a plurality of caller ID numbers is stored in association with a unique prestored PIN. Computer test station 110 compares the received PIN with a PIN stored in association with a matching prestored caller ID number (step 512). Computer test station 110 grants or denies access to functions of computer test station 110 based on the comparison (step 514). More particularly, if computer test station 110 does not find a matching caller ID number, then access is denied. If computer test station 110 finds a matching caller ID number, but the received PIN does not match the prestored PIN stored in association with the prestored caller ID number, then access is denied. If computer test station 110 finds a matching caller ID number, and the received PIN matches the prestored PIN, then access is granted. The flowchart ends at a finish block 516.

In an alternate embodiment, as indicated by a dashed arrow 518 in FIG. 5, computer test station 110 compares the caller ID information with prestored caller ID numbers in database 132 and grants or denies access to functions of computer test station 110 based on the comparison (step 514). More particularly, if the caller ID information received matches one of the caller ID numbers prestored in database 132 then access is granted; otherwise access is denied. Thus, a simple preestablished relationship may provide access to computer test station 110. In this embodiment, no prompting for any user information (e.g., PIN) is necessary.

In another alternate embodiment, steps 510 and 512 are performed for wireless telephone unit 118 only during its initial telephone call to computer test station 110. In this method, if the selected PIN for the initial call matches the prestored PIN, computer test station 110 stores a positive data indication in association with the prestored caller ID number for wireless telephone unit 118 and grants access. For subsequent calls from wireless telephone unit 118, computer test station 110 grants access if the received caller ID matches the prestored caller ID, without any prompt for entry of a PIN.

The methods described in relation to FIG. 5 may be embodied in applications different from computer test stations. For example, the methods described may be embodied in a computer processor of an otherwise conventional answering machine. As another example, the methods may be embodied in a computer processor of an otherwise conventional home appliance automation system. In each application, multiple unique caller IDs (as well as prestored PINs) may be stored for granting access to multiple members of a household having multiple cellular telephones. In each application, multiple conventional functions (retrieve/save/delete voice message functions, selection function for home appliance, control function for on/off power of home appliance, etc.) may be executed after access is granted using the methods described.

Figure 7:
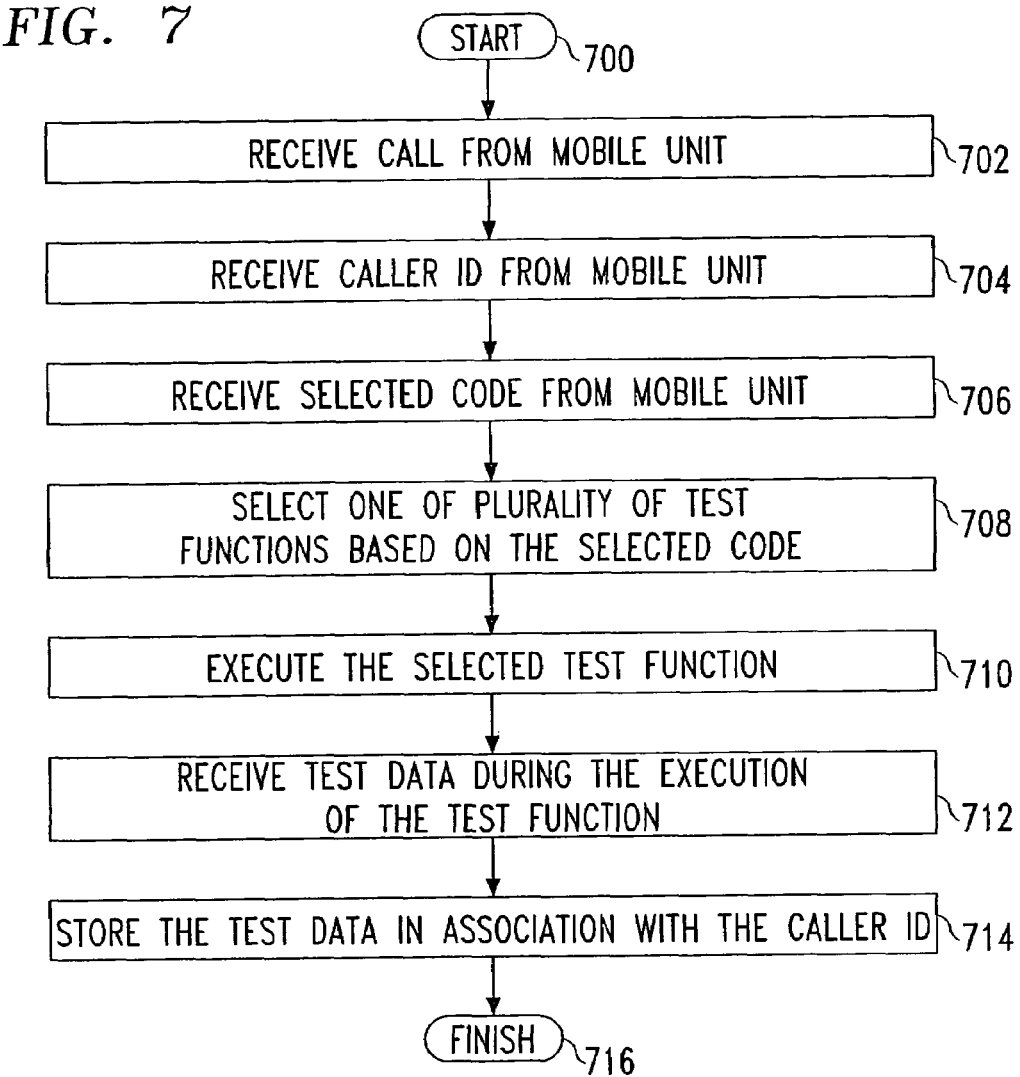
FIG. 7 is a flowchart describing a method for use in testing within the telecommunication system.

FIG. 7 is a flowchart describing a testing method for use in the telecommunication system of FIG. 1. Beginning at a start block 700, computer test station 110 receives a call from wireless telephone unit 118 (step 702). In connection with this call, computer test station 110 receives caller ID information from wireless telephone unit 118 (step 704). As previously described, computer test station 110 has a plurality of different test functions, each one of which is associated with a particular test identification code. In response to a selection made at wireless telephone unit 118 via the user interface (for example, via DTMF signals), computer test station 110 receives and detects one of the plurality of test identification codes (step 706). In response, computer test station 110 selects one of the plurality of test functions based on the test identification code (step 708).

Sometime thereafter, computer test station 110 executes the test function associated with the test identification code (step 710). The execution of the test function typically involves calls between computer test station 110 and wireless telephone unit 118, where computer test station 110 receives and monitors events and/or conditions of the test. Thus, computer test station 110 receives test data during the execution of the test function (step 712). The test may be relatively brief, or span over a long period of time. Computer test station 110 may perform analysis and computations on the test data it receives. In any case, computer test station 110 stores the test data, events and/or conditions, in association with the caller identification information previously received (step 714). The flowchart ends at a finish block 716, but the method described may repeat for a plurality of different wireless telephone units and different test functions.

Advantageously, a number of different test data for a number of different wireless telephone units may be identified and organized appropriately at computer test station 110. Also advantageously, computer test station 110 is operative to simultaneously execute the same or different tests for different wireless telephone units. This may be particularly useful where wireless telephone units 118 and 120 are being simultaneously tested with the same test and in the same test environment (e.g., both in the same moving vehicle).

As a more specific example regarding that described in relation to FIG. 7, a DTMF audio signal corresponding to telephone digit "5" may be selected at wireless telephone unit 118 and received and detected at computer test station 110. Telephone digit "5" may uniquely correspond to a test function referred to as an autodial test or an answered call test. One implementation of the answered call test is described in relation to FIGS. 8 and 9.

Figure 8:
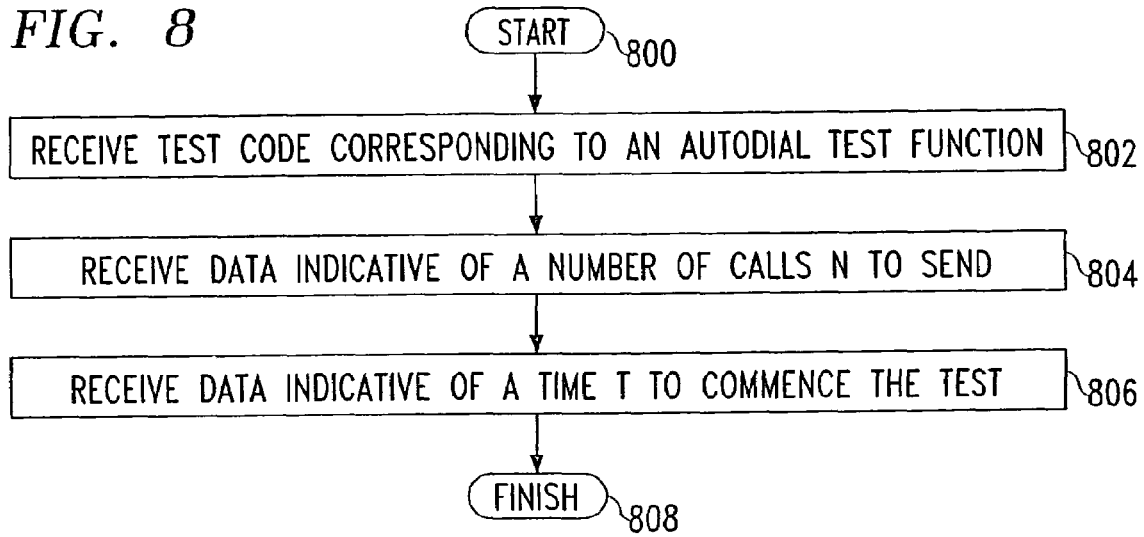
FIG. 8 is a flowchart describing a method of setting up a test function, namely an answered call test, for execution by the computer test station.

FIG. 8 is a flowchart describing a method for configuring one particular test function for execution, namely an answered call test. Beginning at a start block 800, computer test station 110 receives and detects a test identification code corresponding to the answered call test (step 802). This is one example of what may occur during steps 706 and 708 of FIG. 7. In response, computer test station 110 prompts (via the VRU) wireless telephone unit 118 to select test parameters for the answered call test. For example, computer test station 110 prompts wireless telephone unit 118 to select a number of calls N to send. Here, the end-user of wireless telephone unit 118 selects this information via the user interface and computer test station 110 receives data indicative of the number of calls N to send (step 804). As another example, computer test station 110 prompts wireless telephone unit 118 to select a time T (e.g., date and time, or expiration of time after hangup) to commence the testing. Here, the end-user of wireless telephone unit 118 selects this information via the user interface and computer test station 110 receives data indicative of the time T to commence the test (step 806). The call between computer test station 110 and wireless telephone unit 118 is then terminated, and the flowchart ends at a finish block 808. The answered call test, described in relation to FIG. 9, will commence at the selected time T.

Figure 9:
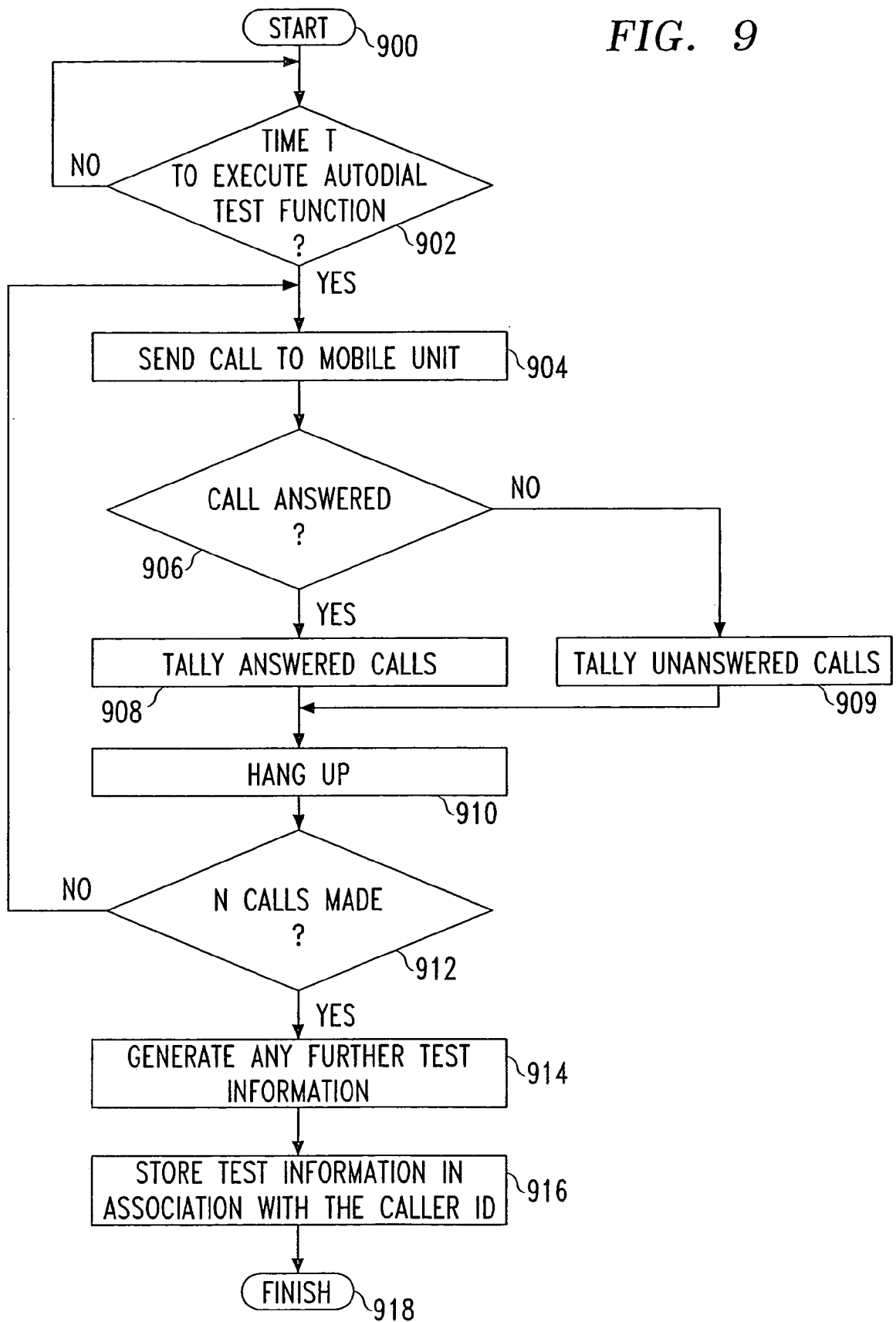
FIG. 9 is a flowchart describing a method of executing the test function which was setup as described in relation to FIG. 8.

FIG. 9 is a flowchart describing a method of testing a wireless telephone unit using the answered call test. Beginning at a start block 900, computer test station 110 monitors the time and determines, at step 902, whether it is time to execute the answered call test. When it is time T, computer test station 110 executes the test function as will be described in connection with the subsequent steps. Computer test station 110 attempts to place a call to wireless telephone unit 118 using the caller identification information previously received and stored (step 904). If wireless telephone unit 118 is able to detect the call page from base station 114, it is able to answer the call; otherwise, it is not able to answer the call. If computer test station 110 detects that wireless telephone unit 118 is available to answer (step 906), then it tallies the call as answered (e.g., increments a counter corresponding to a number of answered calls) (step 908). The call between computer test station 110 and wireless telephone unit 118 is then terminated (step 910). If computer test station 110 detects that wireless telephone unit 118 is not available to answer at step 906, then it tallies the call as not answered (e.g., increments a counter corresponding to a number of unanswered calls) (step 909).

Continuing at step 912 of FIG. 9, computer test station 110 determines if the number of placed test calls is equal to the number of calls N previously selected (step 912). If not, steps 904 through 912 are repeated as shown. If so, the test is mostly completed. Computer test station 110 generates any further information (step 914) and stores all of the test information from the test in association with the caller ID information previously received (step 916). The further information generated in step 914 could be, for example, based on an analysis of all of the test data and/or proper format for presentation or data input. The analysis could include, for example, calculations of percentages, comparisons with other test data from the same or different wireless telephone units, etc. The method ends at a finish block 918, but may repeat for the same or different wireless telephone units. Since computer test station 110 is equipped to simultaneously handle multiple wireless telephone unit tests, this particular method described may be employed simultaneously for multiple wireless telephone unit tests.

FIG. 10 is an illustrative representation of a presentation 1000 from computer test station 110 which shows test data 1002 for multiple wireless telephone units with respect to the answered call test. The first column of data recites the name of the particular data field, and each remaining column provides test data associated with a particular wireless telephone unit. As shown, test data 1002 may include test time/date data 1004, caller ID or MIN data 1006, total calls attempted data 1008, total calls failed data 101, and specific data 1012 regarding the time and success/failure indication. Other useful data is stored and viewable as shown in FIG. 10. As shown, test data is stored in proper association with caller ID/MIN information of each wireless telephone unit. Other data may include, for example, data that identifies where the wireless telephone unit was located for each attempted call.

Figure 11:
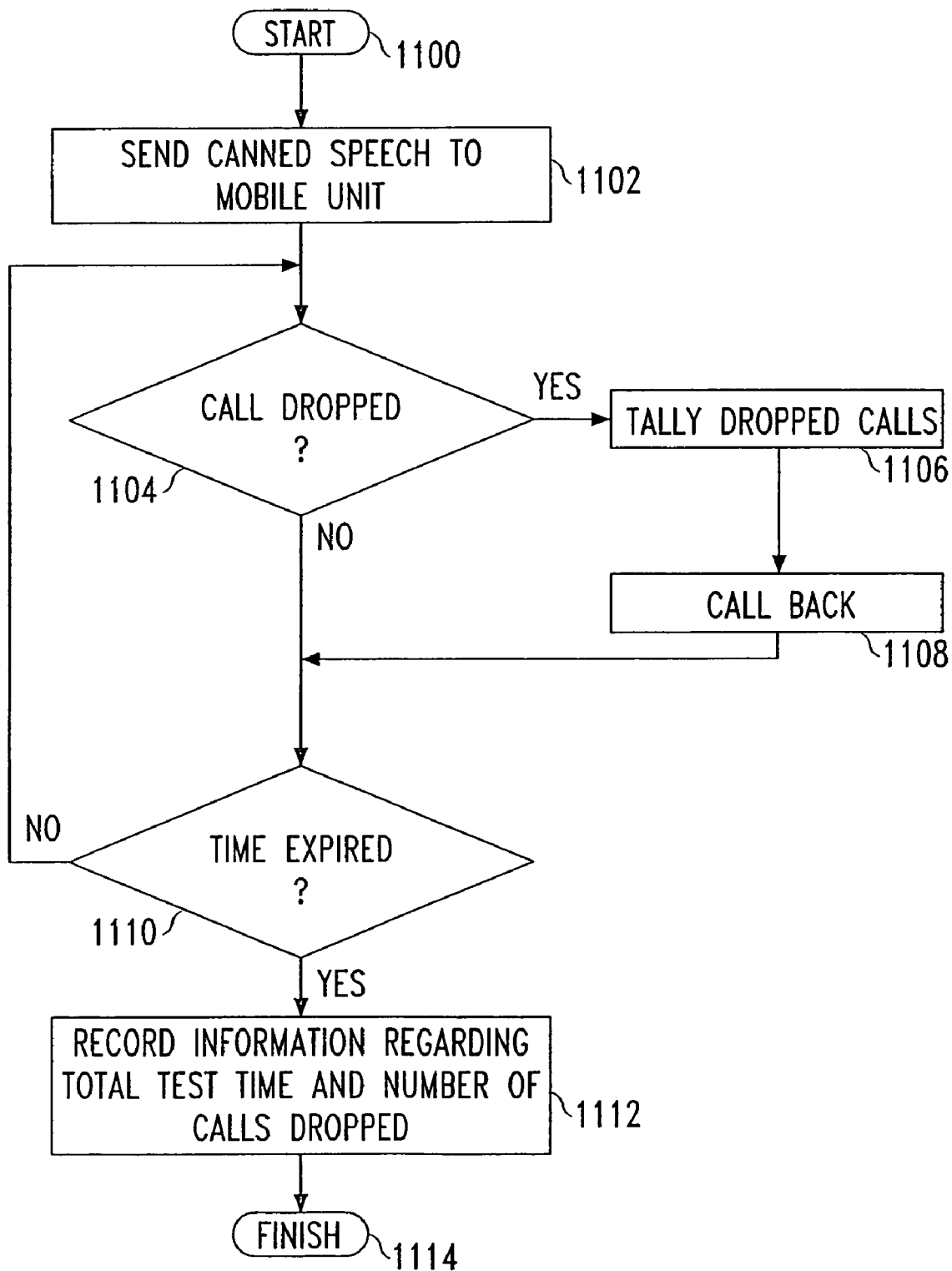
FIG. 11 is a flowchart describing a method of executing a test function, namely a dropped call test.

FIG. 11 is a flowchart describing a method of testing a wireless telephone unit using a test referred to as a "dropped call test," which may also be utilized as an audio quality test. This test may be invoked similarly to that described in relation to FIGS. 8 and 9, that is, by selectively preprogramming the execution of the test function at a particular time or time delay, and using user-selected parameters. Beginning at a start block 1100, where a telephone call has already been established between computer test station 110 and wireless telephone unit 118, computer test station 110 sends audio test signals, such as a predetermined speech sample, to wireless telephone unit 118. These audio test signals may be, for example, male and female voice signals provided by the Telecommunications Industry Association (TIA).

During the telephone call, computer test station 110 detects whether the call has been dropped (step 1104). If the call has not been dropped at step 1104, computer test station 110 determines whether a preselected time period has expired (step 1110). Preferably, the preselected time period is one which was preselected by wireless telephone unit 118 during a previous communication (e.g., similar to that described in relation to FIG. 8). If the time has not expired at step 1110, then computer test station 110 continues monitoring these events back at step 1104. If it is detected that the call has been dropped at step 1104, computer test station 110 tallies it as a dropped call (e.g., by incrementing a counter) (step 1106). Then, computer test station 110 automatically calls back wireless telephone unit 118 using the caller ID information (step 1108). If the time has expired at step 1110, computer test station 110 records the information regarding the total test time and the number of calls dropped over that time period (step 1112). The method ends at a finish block 1114, but may repeat for subsequent tests. Other data stored may include, for example, data that identifies where the wireless telephone unit was geographically located for each dropped call.

FIG. 12 is a flowchart describing a method for use in troubleshooting in a telecommunication system. Beginning at a start block 1200, a telephone call from a wireless telephone unit is received at the computer test station 110 (step 1202). The wireless telephone unit places this telephone call while it is simultaneously connected in a problematic telephone call. In this described method, computer test station 110 operates in a mode to identify the set of functionally different devices utilized in the problematic call. To place this three-way telephone call, the wireless telephone unit is enabled for a three-way calling feature which is well-known in the art.

The problematic telephone call could be due to, for example, one of many conventional devices utilized in the call that is not operating properly. For example, the problematic device may be an "echo canceller" that is not operating properly. Referring back to FIG. 1, MTSO 106 utilizes a plurality of devices 134 for the connection of telephone calls, as do other MTSOs. As shown in FIG. 1, each row of the plurality of devices 134 corresponds to devices that are functionally different, while each column shown corresponds to devices that are functionally the same. For each call established, a different set of functionally different devices are selected and utilized. For example, column 1 ("A" devices) may correspond to a plurality of echo canceller devices (one of which is utilized in a connected call), column 2 ("B" devices) may correspond to a plurality of base station radio devices (one of which is utilized in a connected call), and column 3 ("C" devices) may correspond to a plurality of PSTN route devices (one of which is utilized in a connected call), etc.

Referring back to FIG. 12, caller ID information is sent from the wireless telephone unit and received at computer test station 110 (step 1204). Next, a user of the wireless telephone unit enters information (for example, DTMF signals) to identify the switch utilized in the problematic call, and computer test station 110 receives this data (step 1206). During the three-way telephone call, computer test station 110 records and stores audio signals of the problematic call in a file (e.g., a ".wav" file) (step 1208). Computer test station 110 sends a call trace request through the network using the switch identification information and the caller ID information (step 1210). More specifically, computer test station 110 automatically looks up in a table an IP address associated with the switch, connects to the switch using the IP address, logs in, and issues a trace command with the mobile number.

The network responds to the trace command by sending computer test station 110 call trace information that includes an identification of a plurality of devices utilized in the problematic call (step 1212). Next, computer test station 110 sends a message having at least some of the call trace information and the audio file to a predetermined address (step 1214). Prior to sending the message, computer test station 110 may parse out only that information necessary. Text information of the message may indicate that a problem has been encountered (for example, "PLEASE CHECK OR REPLACE THE ECHO CANCELLER IDENTIFIED IN THIS CALL"). The message may be sent to wireless telephone unit 118, to some computer device to initiate repairs (e.g., a system maintenance computer), or both. The message may be, for example, an electronic mail (e-mail) message where the audio file is sent as an attachment or enclosure. If a message is sent to wireless telephone unit 118, computer test station 110 uses the caller ID information as the email address of wireless telephone unit 118. The method ends at a finish block 1216, but may repeat for subsequent calls and requests.

The call trace information received in step 1212 may read as follows:

| Trace Captured Date & Time: | 11/09/1999 11:36:11 AM |
|---|---|
| Switch: | BOYNTON |
| Mobile Number: | 5613461655 |

WO   PBIT2*195005*14729A51H   AT-32   TIME 991109 1138 PA
<CTRAI:SNB=5613461655;

-continued

CALL PATH TRACING

XSS TRACING

| IDX | SWDEV | DEV | DEVIDX | FID |
|---|---|---|---|---|
| 1 | MTA-1930 | | 2 | 3 H'03AC 001C |
| | | | 4 | |
| 2 | CHCDR-2095 | | 5 | 1 H'03AC 001C |
| 3 | MSCHC-2363 | | 1 | 7 H'03AC 001C |
| | | | 8 | |
| 4 | MSSH-695 | | 1 | 9 H'03AC 001C |
| | | | 10 | 11 |
| 5 | CLCOF-2015 | | 2 | 12 H'03AC 001C |
| | | | 13 | |
| 6 | CHVIEW-1-764 | | | |
| 7 | MCHC-645 | | 3 | 14 H'03AC 001C |
| 8 | MPOOL-4069 | | 3 | 15 H'03AC 001C |
| 9 | MSEVR-35640 | | 4 | 16 H'03AC 001C |
| 10 | MAUTH-37897 | | 4 | H'03AC 001C |
| 11 | MFRAUD-695 | | 4 | H'03AC 001C |
| 12 | UPAPOTB-6597 | | 5 | 17 H'03AC 001C |
| 13 | SUPIA-1208 | | 5 | H'03AC 001C |
| 14 | MDVC-3119 | | 7 | 18 H'03AC 001C |
| 15 | MECHO-2183 | | 8 | 19 H'03AC 001C |
| 16 | MAUTHD-2000 | | 9 | H'03AC 001C |
| 17 | UPPCB-6597 | | 20 | 12 H'0000 0001 |
| | | | 21 | |
| 18 | | MBTRAC-4995 | 14 | H'03AC 001C |
| 19 | | MECHO-2207 | 15 | H'03AC 001C |
| 20 | UPAMHRB-6597 | | 17 | 22 H'0000 0001 |
| 21 | UPAMHSB-6597 | | 17 | H'0000 0001 |
| 22 | UPLTD-2504 | | 23 | 20 H'0000 0001 |
| 23 | UPDC-2504 | | 24 | 22 H'0000 0001 |
| 24 | | UPD24A-2504 | 23 | H'0000 0001 |

SWITCH CONNECTED DEVICE

| IDX | MUP | LINK | MUP |
|---|---|---|---|
| 18 | GS-30-451 | GS-030027-241 | |
| 19 | GS-27-167 | GS-027031-500 | |
| 24 | GS-31-208 | GS-031027-244 | |

| TAG | IDX | MISCDATA |
|---|---|---|
| 36 | 9 | 5613461655 |
| 41 | 9 | 5613461655 |

AM TRAFFIC LEVEL TRACING

| IDX | SWDEV | DEV | DEVIDX | FID |
|---|---|---|---|---|
| 1 | CHVIEW-1-764 | | | H'03AC 001C |
| 2 | CHCDR-2095 | | | |
| END | | | | |
| < | | | | |

Referring to the call trace information above, an echo canceller device may be found at number 15 or "MECHO," where the particular echo canceller device utilized in the call is identified by the number "2183." A base station radio device may be found at number 14 or "MDVC," where the particular base station radio device utilized in the call is identified by the number "3119." A PSTN route device may be found at numbers 18, 19, and 24 or "IDX MUP" and "LINK" where the particular PSTN route device utilized in the call may be identified by the associated alphanumeric information. The trace command is shown as "CTRAI: SNB=5613461655," where 5613461655 corresponds to the MIN of wireless telephone unit 118.

It should be readily apparent and understood that the foregoing description is only illustrative of the invention and in particular provides preferred embodiments thereof. Various alternatives and modifications can be devised by those skilled in the art without departing from the true spirit and scope of the invention. Accordingly, the present invention is intended to embrace all such alternatives, modifications, and variations which fall within the scope of the appended claims.

What is claimed is:

1. A test station for testing the operation of a wireless telephone unit within a wireless communication system, the test station comprising:
  a computer;
  wireless communication test software residing on memory that is accessible to the computer;
  a computer telephony card coupled to the computer; and the computer telephony card having a plurality of telephone line interfaces, each telephone line interface associated with a respective one of a plurality of telephone numbers in a hunt group.

2. The test station according to claim 1, wherein the plurality of telephone numbers of the hunt group are accessible by an abbreviated dialing telephone number.

3. A test station for testing a wireless telephone unit within a wireless communication system, the test station comprising:
  a computer;
  wireless communication test software residing on memory that is accessible to the computer;
  a computer telephony card coupled to the computer; and the computer telephony card having at least one telephone line interface, wherein the at least one telephone line interface comprises a plurality of telephone line interfaces, each interface of the plurality of telephone line interfaces being associated with a respective one of a plurality of telephone numbers of a hunt group, the hunt group being accessible by an abbreviated dialing telephone number.

4. A telecommunication system method for providing a plurality of wireless telephone units with remote access to a computer test station, the method comprising:
  receiving an abbreviated dialing telephone number to establish a telephone call connection;
  selecting one of a plurality of telephone numbers of a hunt group that is associated with the abbreviated dialing telephone number, each one of the plurality of telephone numbers associated with a computer test station; and
  facilitating the telephone call connection between a wireless telephone unit and the computer test station with use of the selected telephone number.

5. The method according to claim 4, wherein the step of receiving comprises receiving the abbreviated dialing telephone number at a mobile telephone switch.

* * * * *